(12) United States Patent
Mochizuki

(10) Patent No.: US 9,593,818 B2
(45) Date of Patent: Mar. 14, 2017

(54) VEHICULAR MARKER LAMP

(75) Inventor: Kazuhisa Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 741 days.

(21) Appl. No.: 12/248,212

(22) Filed: Oct. 9, 2008

(65) Prior Publication Data

US 2009/0097268 A1    Apr. 16, 2009

(30) Foreign Application Priority Data

Oct. 12, 2007  (JP) .................... 2007-266015

(51) Int. Cl.
*F21S 8/10*    (2006.01)
*F21Y 101/00*  (2016.01)

(52) U.S. Cl.
CPC ....... *F21S 48/1388* (2013.01); *F21S 48/1159* (2013.01); *F21S 48/145* (2013.01);
(Continued)

(58) Field of Classification Search
CPC ............. F21V 2200/10; F21V 2200/13; F21V 2200/17; F21K 9/52; G09F 2013/049; G09F 2013/1831
(Continued)

(56) References Cited

U.S. PATENT DOCUMENTS 6,161,951 A * 12/2000 Yoneyama et al. ............ 362/516
6,382,823 B1 * 5/2002 Kibayashi ..................... 362/548
(Continued)

FOREIGN PATENT DOCUMENTS

DE   10 2007 002 689 A1   9/2007

OTHER PUBLICATIONS

Office Action for German Application No. 10 2008 051 109.9-54 dated Aug. 12, 2009 and English translation thereof, 8 pages.

*Primary Examiner* — Jong-Suk (James) Lee
*Assistant Examiner* — Mark Tsidulko
(74) *Attorney, Agent, or Firm* — Osha Liang LLP

(57) ABSTRACT

An automobile headlamp includes a plurality of projection light source units disposed in a lamp chamber. Each of the plurality of projection light source units includes a projection lens; a cut-off line forming shade extending approximately horizontally and forward such that an extending tip section thereof is located in a vicinity of a rearward focal point of the projection lens; a light-emitting element as a light source provided on both upper and lower sides of the shade; and a reflector, which reflects light emitted from the light-emitting element to be guided to the projection lens, provided on both upper and lower sides of the shade. A low-beam distribution pattern having a predetermined cut-off line is formed by a light source unit section on an upper side formed of the projection lens, the shade, the light-emitting element on the upper side, and the reflector on the upper side. An additional high-beam distribution pattern having a lower end cut-off line which approximately coincides with the predetermined cut-off line is formed by the light source unit section on a lower side formed of the projection lens, the shade, the light-emitting element on the lower side, and the reflector on the lower side. At least one of the plurality of projection light source units has an optical axis set to be parallel to an optical axis of the headlamp and at least one of the plurality of projection light source units has an optical axis set to be slightly tilted forward and downward with respect to the optical axis of the headlamp.

12 Claims, 10 Drawing Sheets

(52) U.S. Cl.
CPC ......... *B60Q 2200/36* (2013.01); *F21S 48/142* (2013.01); *F21Y 2101/00* (2013.01)

(58) Field of Classification Search
USPC ....... 362/544, 460, 507, 523, 525, 532, 538, 362/539
See application file for complete search history.

(56) References Cited

U.S. PATENT DOCUMENTS

| | | | |
|---|---|---|---|
| 6,550,951 B2* | 4/2003 | Tanaka et al. | 362/546 |
| 6,623,147 B2* | 9/2003 | Hayami et al. | 362/467 |
| 7,114,837 B2* | 10/2006 | Yagi et al. | 362/523 |
| 7,387,416 B2 | 6/2008 | Tsukamoto et al. | |
| 7,726,858 B2* | 6/2010 | Sato et al. | 362/538 |
| 2005/0068787 A1* | 3/2005 | Ishida | 362/538 |
| 2007/0171650 A1 | 7/2007 | Ishida | |

* cited by examiner

VEHICULAR MARKER LAMP

BACKGROUND OF INVENTION

Field of the Invention

The present invention relates to an automobile headlamp in which a plurality of projection light source units, each including a projection lens, a cut-off line forming shade, light-emitting element as a light source, and a reflector reflecting light emitted from the light-emitting element forward, are disposed in a lamp chamber and in which light distribution patterns of the plurality of projection light source units are synthesized to form a light distribution pattern of the headlamp.

Related Art

In recent years, vehicular marker lamps in which a light-emitting element such as a light-emitting diode is the light source have been employed for automobile headlamps and the like.

For example, Patent Document 1 discloses an automobile headlamp in which a plurality of each of projection light source units for forming a low beam with a light-emitting element as a light source and projection light source units for forming a high beam with a light-emitting element as a light source in the same manner are disposed in a lamp chamber.

The projection light source unit for forming a low beam includes a projection lens, a cut-off line forming shade, the light-emitting element, and a reflector, and the projection light source unit for forming a high beam includes a projection lens, the light-emitting element, and a reflector.

Patent Document 2 discloses a vehicular projection light source unit including a projection lens, a cut-off line forming shade, a light-emitting element, and a reflector. The light-emitting elements and the reflectors are respectively provided on both upper and lower sides of the cut-off line forming shade formed to extend forward and approximately horizontally such that a tip thereof is situated in the vicinity of a rearward focal point of the projection lens. A low-beam distribution pattern having a predetermined cut-off line is formed by a light source unit section on the upper side formed of the projection lens, the shade, the light-emitting element on the upper side, and the reflector on the upper side (by lighting the light-emitting element on the upper side). An additional high-beam distribution pattern (which is a part of a high-beam distribution pattern) having a lower end cut-off line which approximately coincides with the predetermined cut-off line is formed by a light source unit section on the lower side formed of the projection lens, the shade, the light-emitting element on the lower side, and the reflector on the lower side (by lighting the light-emitting element on the lower side). That is, the low-beam distribution pattern and the high-beam distribution pattern can be formed by a single projection light source unit.

[Patent Document 1]
U.S. Pat. No. 7,114,837
[Patent Document 2]
U.S. Pat. No. 7,387,416

SUMMARY OF INVENTION

The inventor has conceived that employing a configuration such as that disclosed in Patent Document 2 described above (i.e., a structure by which the low-beam distribution pattern and the high-beam distribution pattern can both be formed) as respective projection light source units stored in a lamp chamber in a lamp configuration such as that disclosed in Patent Document 1 described above allows the number of light source units stored in the lamp chamber to be reduced and the lamp chamber to be made small (allows a headlamp to be made compact).

A prototype of a headlamp was made, in which projection light source units forming three types of light distribution patterns of large, medium, and small are disposed in the lamp chamber, and light was radiated to a light distribution screen. Thus, a low-beam distribution pattern and a high-beam distribution pattern shown in FIGS. 15 and 16 were formed. However, there was a problem that a band-shaped dark zone Dz appears along a horizontal line H-H in the high-beam distribution pattern (see FIG. 16), whereby the forward visibility decreases.

As a result of studying by the inventor, it has been found that, while the light distribution of the high beam of the headlamp is formed as a synthesized light distribution pattern (see FIGS. 15 and 16) of light distribution patterns (see FIGS. 17(a), 17(b), and 17(c)) formed by each of the three types of the projection light source units, dark zones Dza, Dzb, and Dzc appearing in each of the high-beam distribution patterns formed by the respective projection light source units overlap with each other, whereby the dark zone Dz stands out.

That is, as shown in FIGS. 17(a), 17(b), and 17(c), the high-beam distribution patterns of the respective projection light source units forming the prototype headlamp have shapes in which an additional high-beam distribution pattern Pha (Phb, Phc) having a predetermined lower end cut-off line formed by a light source unit section on the lower side (by lighting a light-emitting element on the lower side) is placed above a low-beam distribution pattern Psa (Psb, Psc) having a predetermined cut-off line formed by a light source unit section on the upper side (by lighting a light-emitting element on the upper side) such that the two cut-off lines become close to each other. Due to the structure in which the light source unit section on the upper side and the light source unit section on the lower side share the projection lens and the cut-off line forming shade, the dark zones Dza (Dzb, Dzc) exist between the two cut-off lines. Optical axes of the respective projection light source units forming the headlamp are all set to be parallel, whereby cut-off lines on the upper ends of the low-beam distribution patterns Psa (Psb, Psc) of the respective projection light source units all coincide (see FIG. 15) such that a clear cut-off line can be formed with the low beam of the headlamp. Therefore, in the high-beam distribution pattern of the headlamp (see FIG. 16) obtained by synthesizing the high-beam distribution patterns of the respective projection light source units (see FIGS. 17(a), 17(b), and 17(c)), it is considered that the dark zone Dz stands out due to the dark zones Dza, Dzb, and Dzc at the same height overlapping with each other.

The inventor has conceived that the dark zones in the high-beam distribution patterns of the respective projection light source units do not overlap with each other when the optical axes of the respective projection light source units are displaced in the up-down direction, whereby the dark zone of the synthesized high-beam distribution pattern of the headlamp does not stand out. A prototype of the headlamp with such structure was made and tested, whereby the effectiveness was proven. Thus, the present application has been filed.

One or more embodiments of the present invention have been made in view of the situation described above and provide a compact automobile headlamp in which a plurality of projection light source units with a light-emitting element as a light source are stored in a lamp chamber, and in which a dark zone in a synthesized high-beam distribution pattern does not stand out although dark zones do appear in high-beam distribution patterns of each of the projection light source units.

In an automobile headlamp according to one or more embodiments, a plurality of projection light source units, each including a projection lens, a cut-off line forming shade, a light-emitting element as a light source, and a reflector which reflects light emitted from the light-emitting element to be guided to the projection lens is disposed in a lamp chamber, and light distribution patterns that are formed by the plurality of projection light source units are synthesized to form a light distribution pattern of the headlamp. In each of the projection light source units, the shade extends approximately horizontally and forward such that an extending tip section thereof is located in the vicinity of a rearward focal point of the projection lens, the light-emitting elements and the reflectors are provided on both upper and lower sides of the shade, and a low-beam distribution pattern having a predetermined cut-off line is formed by the light source unit section on an upper side formed of the projection lens, the shade, the light-emitting element on the upper side, and the reflector on the upper side, and an additional high-beam distribution pattern having a lower end cut-off line which approximately coincides with the predetermined cut-off line, is formed by the light source unit section on a lower side formed of the projection lens, the shade, the light-emitting element on the lower side, and the reflector on the lower side. With respect to an optical axis of one projection light source unit set to be parallel to an optical axis of the headlamp, an optical axis of an alternative projection light source unit(s) is slightly tilted forward and downward.

The light distribution of the headlamp is formed as the synthesized light distribution pattern in which light distribution patterns formed by the plurality of projection light source units stored in the lamp chamber are synthesized. In the respective projection light source units, the low-beam distribution pattern having the predetermined cut-off line is formed by the light source unit section on the upper side (by lighting the light-emitting element on the upper side), and the high-beam distribution pattern in which the low-beam distribution pattern and the additional high-beam distribution pattern are synthesized is formed by the light source unit section on the upper side and the light source unit section on the lower side (by simultaneously lighting the light-emitting element on the upper side and the light-emitting element on the lower side). In other words, the low-beam distribution pattern and the high-beam distribution pattern can be formed by the respective projection light source units.

That is, the projection light source units have been formed as separate parts for a low beam and for a high beam to likely increase the size of the lamp chamber (headlamp) storing the light source units. However, in one or more embodiments, the light distribution patterns for both a low beam and a high beam can be formed by the single projection light source unit, whereby the number of light source units disposed in the lamp chamber can be reduced correspondingly to reduce the size of the lamp chamber (headlamp).

The high-beam distribution patterns of each of the projection light source units are formed as synthesized patterns of the low-beam distribution pattern, which has the predetermined cut-off line along the horizontal line H-H of the light distribution screen and is below the horizontal line H-H, and the additional high-beam distribution pattern, which has the lower end cut-off line to approximately coincide with the cut-off line and is above the horizontal line H-H. Due to the structure in which the light source unit section on the upper side and the light source unit section on the lower side share the cut-off line forming shade, a dark zone is formed between the two cut-off lines.

In the case where the optical axes of the respective projection light source units are all set to be parallel, the respective dark zones at the same height overlap with each other in the high-beam distribution pattern of the headlamp (light distribution pattern in which the high-beam distribution patterns of each of the projection light source units are synthesized) to cause the dark zone to further stand out.

Thus, in one or more embodiments, with respect to the optical axis of one projection light source unit which is set to be parallel to the optical axis of the headlamp, the optical axis of the alternative projection light source unit is slightly tilted forward and downward, whereby the dark zone in the high-beam distribution pattern of the alternative projection light source unit is displaced downward with respect to the dark zone of the high-beam distribution pattern of the one projection light source unit. That is, the dark zone in the high-beam distribution pattern of the one (alternative) projection light source unit overlaps with a high-beam distribution pattern region (illuminated region) of the alternative (one) projection light source unit. In other words, the respective dark zones move within the light distribution patterns (illuminated regions) to be diluted, whereby the dark zone does not stand out in the high-beam distribution pattern of the headlamp (i.e., light distribution pattern in which the high-beam distribution patterns of the respective projection light source units are synthesized).

In the headlamp in which the plurality of projection light source units are stored in the lamp chamber, it is said that an excessive contrast difference above and below the cut-off line of the low-beam distribution pattern is one factor in decreasing the forward visibility. However, in the low-beam distribution pattern of the headlamp (light distribution pattern in which the low-beam distribution patterns of the respective projection light source units are synthesized) of one or more embodiments, (the cut-off line of the low-beam distribution pattern of the alternative projection light source unit is slightly displaced downward with respect to (the cut-off line of) the low-beam distribution pattern of the one projection light source unit which is set to be parallel to the optical axis of the headlamp, whereby the excessive contrast difference above and below the cut-off line of the low-beam distribution pattern of the headlamp is reduced and the illuminated region on the near side ahead of the vehicle is somewhat enlarged.

According to one or more embodiments, in the automobile headlamp described above, the optical axis of the alternative projection light source unit(s) is tilted forward and downward with respect to the optical axis of the one projection light source unit at least by a degree corresponding to a width in an up-down direction (displacement between the predetermined cut-off line of the low-beam distribution pattern and the lower end cut-off line of the additional high-beam distribution pattern) of a dark zone in the high-beam distribution pattern of the one projection light source unit.

Overlapping of the dark zones in each of the high-beam distribution patterns of the one projection light source unit and the alternative projection light source unit can reliably be avoided, that is, the dark zone in the high-beam distribution pattern of the one (alternative) projection light source unit reliably overlaps with the high-beam distribution pattern region (illuminated region) of the alternative (one) projection light source unit, whereby the dark zone in the high-beam distribution pattern of each projection light source unit is reliably moved within the high-beam distribution pattern (illuminated region) of another projection light source unit to be diluted, whereby the dark zone in the high-beam distribution pattern of the headlamp further does not stand out.

According to one or more embodiments, in the automobile headlamp described above, the one projection light source unit is formed as a first projection light source unit which forms a small diffusion light distribution pattern illuminating mainly a region in the vicinity of the optical axis of the headlamp, and the alternative projection light source units are formed as a second projection light source unit which has an optical axis slightly tilted forward and downward with respect to an optical axis of the first projection light source unit and which forms a medium diffusion light distribution pattern one size larger than the small diffusion light distribution pattern, and as a third projection light source unit which has an optical axis slightly tilted forward and downward with respect to the optical axis of the second projection light source unit and which forms a large diffusion light distribution pattern one size larger than the medium diffusion light distribution pattern.

Because the dark zone of each of the first, second, and third projection light source units moves within the light distribution patterns (illuminated regions) of the other two projection light source units to be diluted such that, for example, the dark zone in the high-beam distribution pattern of the first projection light source unit overlaps with the high-beam distribution patterns (illuminated regions) of the second and third projection light source units, whereby the dark zone does not stand out at all in the high-beam distribution pattern of the headlamp (i.e., light distribution pattern in which the high-beam distribution patterns of the respective projection light source units are synthesized).

In the low-beam distribution pattern of the headlamp, (the cut-off lines of) the low-beam distribution patterns of the second and third projection light source units are sequentially slightly displaced downward with respect to (the cut-off line of) the low-beam distribution pattern of the first projection light source unit which is set to be parallel to the optical axis of the headlamp, whereby the excessive contrast difference above and below the cut-off line of the low-beam distribution pattern of the headlamp is further reduced and the illuminated region on the near side ahead of the vehicle is further enlarged.

One or more embodiments provide the automobile headlamp described above, in which the plurality of projection light source units are integrated with a metal bracket as a light source unit assembly, and an aiming adjustment is made possible by an aiming mechanism mounted between a lamp body which segments the lamp chamber, and the metal bracket.

By operating the aiming mechanism, the direction of the light source unit assembly with respect to the lamp body (the optical axis of the headlamp) can be adjusted.

In the automobile headlamp described above, the reflector may be formed on the upper side to reflect light from the light-emitting element that is provided rearward with respect to the rearward focal point of the projection lens in the vicinity of the optical axis of the projection light source unit, toward the optical axis as well as to provide an upward reflective surface which extends rearward approximately along the optical axis from the vicinity of the rearward focal point of the projection lens, on an upper surface of the shade so as to reflect a part of reflected light from the reflector on the upper side upward, and to provide a downward reflective surface on a lower surface of the shade so as to extend rearward and obliquely downward from a front end edge of the upward reflective surface as well as to form the reflector on the lower side such that light from the light-emitting element on the lower side, which is arranged below the optical axis, is reflected upward to approximately converge in a portion of the downward reflective surface in the vicinity of the rearward focal point of the projection lens.

The high-beam distribution patterns formed by the respective projection light source units have shapes in which the additional high-beam distribution pattern having the predetermined lower end cut-off line formed by the light source unit section on the lower side is placed above the low-beam distribution pattern having the predetermined cut-off line formed by the light source unit section on the upper side such that the two cut-off lines become close to each other. Because the upward reflective surface of the light source unit section on the upper side reflects a part of reflected light from the reflector on the upper side upward and the downward reflective surface of the light source unit section on the lower side reflects a part of reflected light (convergent light) from the reflector on the lower side toward the projection lens, the amount of light in a region along the cut-off line of the low-beam distribution pattern (additional high-beam distribution pattern) increases, whereby the forward visibility improves correspondingly.

According to one or more embodiments, the number of the light source units stored in the lamp chamber is reduced, whereby a compact headlamp can be provided at low cost.

The dark zone in the high-beam distribution pattern of each respective light source unit moves within the high-beam distribution pattern of another light source unit such that the dark zone in the high-beam distribution pattern of the headlamp is diluted to barely stand out, whereby the high beam provides an excellent forward visibility.

The excessive contrast difference above and below the cut-off line of the low-beam distribution pattern of the headlamp is reduced and the illuminated region on the near side ahead of the vehicle is somewhat enlarged, whereby the low beam also provides an excellent forward visibility.

According to one or more embodiments, the dark zone in the high-beam distribution pattern of each light source unit is reliably taken in within the high-beam distribution pattern of another light source unit to be diluted such that the dark zone in the high-beam distribution pattern of the headlamp further does not stand out, whereby the headlamp with a further excellent forward visibility using the high beam is provided.

According to one or more embodiments, the dark zone of the high-beam distribution pattern of each light source unit moves within the high-beam distribution patterns of the other two light source units such that the dark zone in the high-beam distribution pattern of the headlamp is diluted and does not stand out at all, whereby the high beam provides a further excellent forward visibility.

Because the excessive contrast difference above and below the cut-off line of the low-beam distribution pattern of the headlamp is further reduced and the illuminated region on the near side ahead of the vehicle is further enlarged, the low beam also provides a further excellent forward visibility.

According to one or more embodiments, in the case where the optical axis of the headlamp is out of place, the aiming mechanism can easily make an aiming adjustment.

Other aspects and advantages of the invention will be apparent from the following description, the drawings and the claims.

DETAILED DESCRIPTION

Next, embodiments of the present invention will be described with reference to the drawings.

Figure 1:
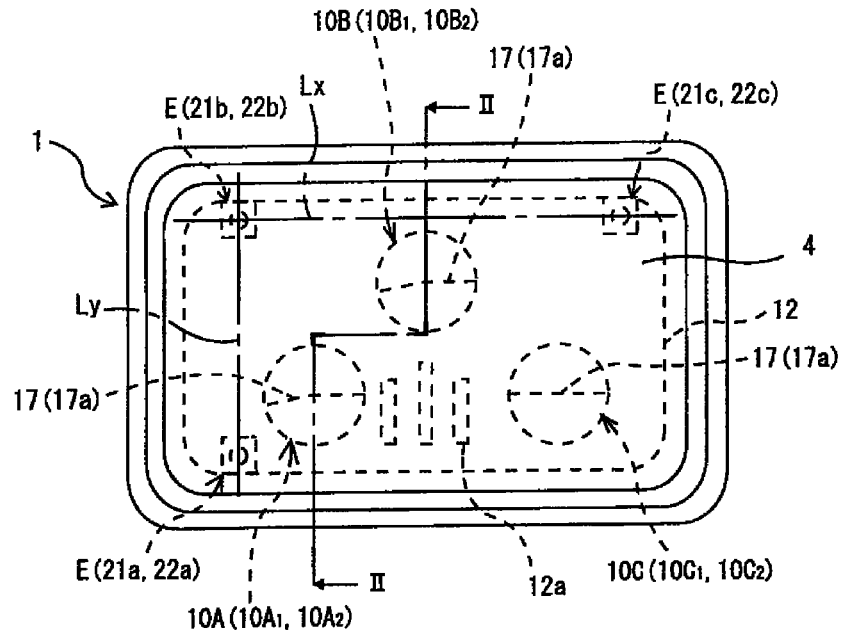
FIG. 1 is a front view of an automobile headlamp of one embodiment of the present invention.
Figure 2:
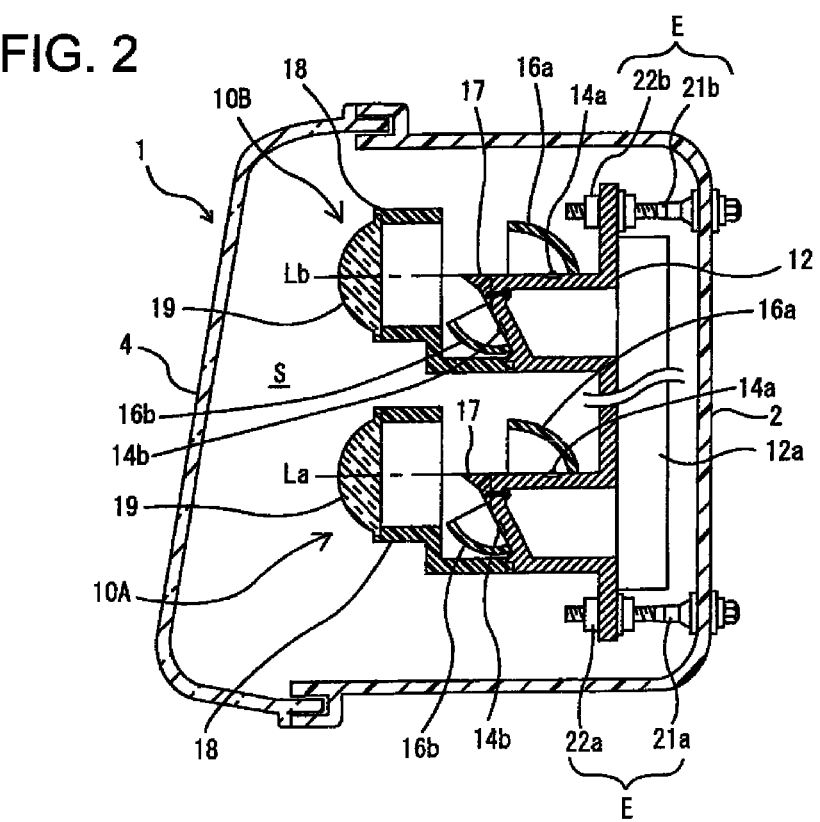
FIG. 2 is a vertical sectional view (sectional view along line II-II shown in FIG. 1) of the headlamp.
Figure 3:
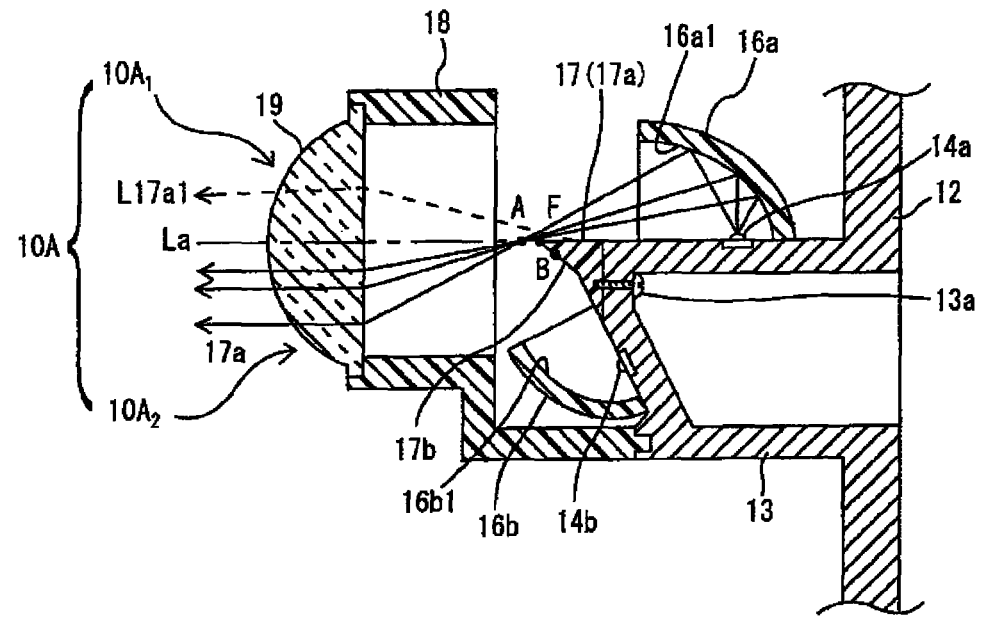
FIG. 3 is a vertical sectional view of a first projection light source unit forming a projection light source unit assembly stored in a lamp chamber, and is a view showing an optical path in an upper side light source unit section which forms a low-beam distribution pattern.
Figure 4:
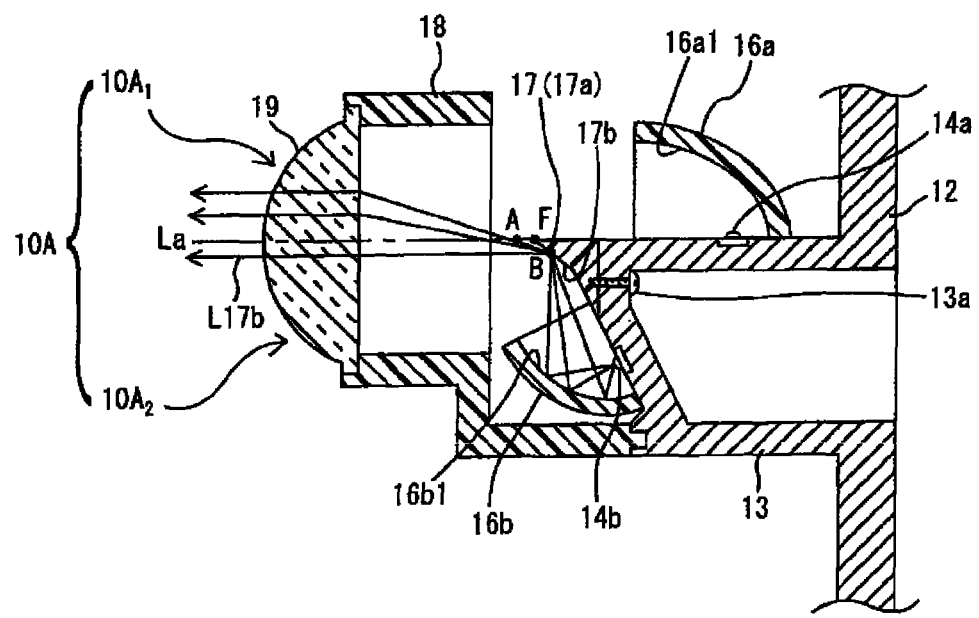
FIG. 4 is a vertical sectional view of the first projection light source unit, and is a view showing an optical path in a lower side light source unit section which forms an additional high-beam distribution pattern.
Figure 5A:
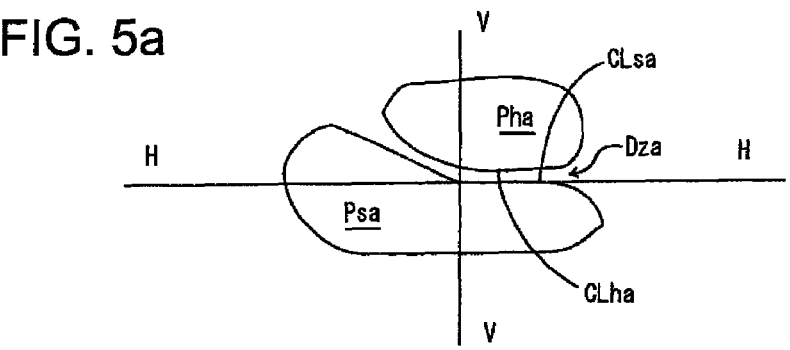
FIGS. 5A to 5C are front views showing light distribution patterns of first to third projection light source units forming the projection light source unit assembly.
Figure 5B:
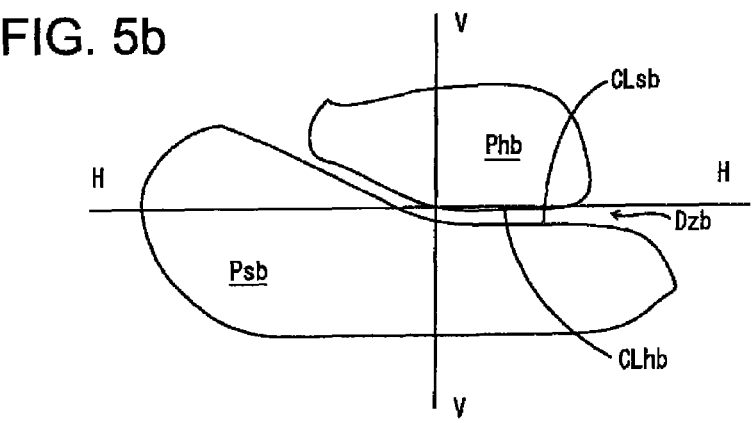
Figure 5C:
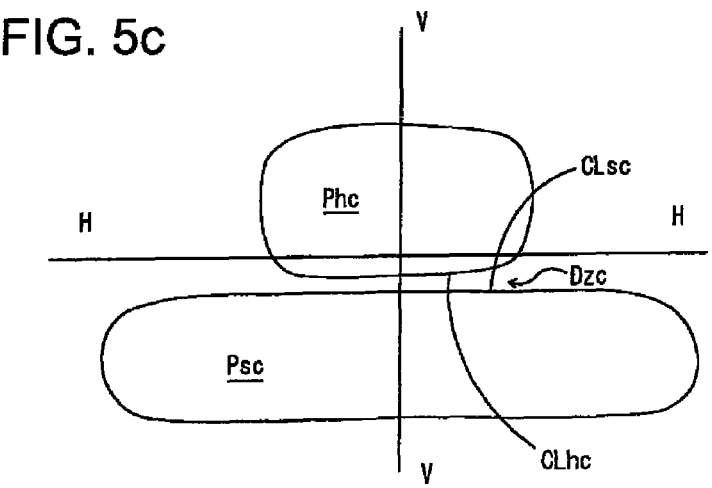
Figure 6:
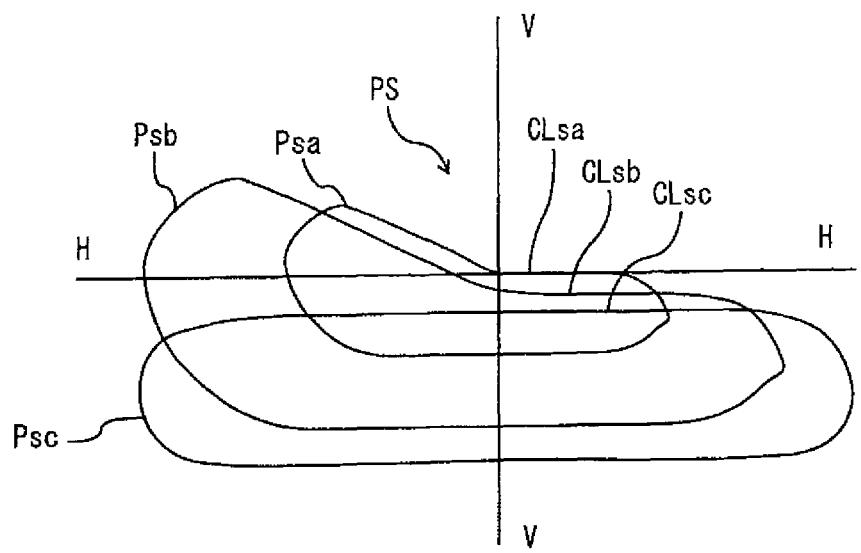
FIG. 6 is a front view showing a low-beam distribution pattern of the headlamp (projection light source unit assembly).
Figure 7:
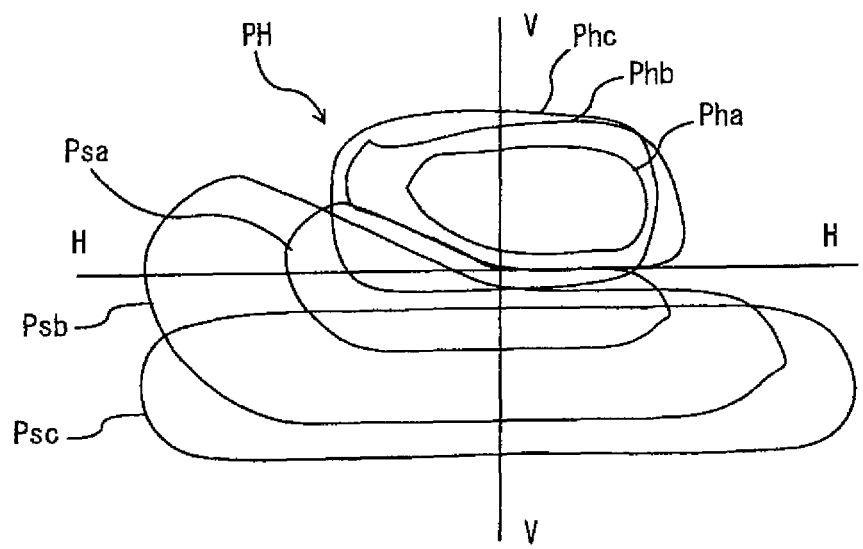
FIG. 7 is a front view showing a high-beam distribution pattern of the headlamp (projection light source unit assembly).

FIGS. 1 to 8 show an automobile headlamp according to one embodiment of the present invention. FIG. 1 is a front view of the automobile headlamp, FIG. 2 is a vertical sectional view (sectional view along line II-II shown in FIG. 1) of the headlamp, FIG. 3 is a vertical sectional view of a first projection light source unit forming a projection light source unit assembly stored in a lamp chamber and is a view showing an optical path in an upper side light source unit section which forms a low-beam distribution pattern, FIG. 4 is a vertical sectional view of the first projection light source unit and is a view showing an optical path in a lower side light source unit section which forms an additional high-beam distribution pattern, FIGS. 5A to 5C are front views showing light distribution patterns of first to third projection light source units forming the projection light source unit assembly, FIG. 6 is a front view showing a low-beam distribution pattern of the headlamp (projection light source unit assembly), FIG. 7 is a front view showing a high-beam distribution pattern of the headlamp (projection light source unit assembly), and FIGS. 8A and 8B are illustrative views for illustrating a state in which a dark zone in the high-beam distribution pattern is diluted.

In FIGS. 1 and 2, the structure of an automobile headlamp 1 is such that a light source unit assembly 10, in which three projection light source units 10A, 10B, and 10C are integrated with a lamp bracket 12, is stored in a lamp chamber S segmented by a container-shaped lamp body 2 and a transparent front surface cover 4. The light source unit assembly 10 is supported so as to be capable of being tilted in the right-left direction and the up-down direction (i.e., capable of an aiming adjustment) by an aiming mechanism E mounted between the lamp bracket 12 and the lamp body 2.

The aiming mechanism E includes three aiming screws 21a, 21b, and 21c rotatably supported by front/back insertion holes provided to a back surface wall of the lamp body 2, and aiming nuts 22a, 22b, and 22c attached to the lamp bracket 12 while being screwed to the respective aiming screws 21a, 21b, and 21c. By a rotational operation of the aiming screws 21a and 21c, the tilt of the light source unit assembly 10 (lamp bracket 12) can be tiltably adjusted with respect to a horizontal tilt axis (axis passing the nuts 22b and 22c) Lx and a vertical tilt axis (axis passing the nuts 22b and 22a) Ly. That is, the aiming screw 21a and the aiming screw 21c function as a vertical aiming screw which adjusts an optical axis of the headlamp 1 in the up-down direction and as a horizontal aiming screw which adjusts the optical axis of the headlamp 1 in the right-left direction, respectively.

The light source unit assembly 10 has a structure in which three first, second, and third projection light source units 10A, 10B, and 10C are aligned and integrated on the front surface side of the lamp bracket 12 formed of metal, such as aluminum, having high thermal conductivity and an approximately rectangular shape when seen from the front. Each of the projection light source units 10A, 10B, and 10C includes light-emitting elements 14a and 14b as light sources attached to a cylinder-shaped forward swelling section 13 which protrudes on the front surface side of the bracket 12, resin reflectors 16a and 16b attached to the forward swelling section 13 to cover the light-emitting elements 14a and 14b, respectively, a resin cut-off line forming shade 17 attached to an upper tip section of the forward swelling section 13 by a thread 13a, and a resin projection convex lens 19 being held by a resin lens holder IS attached to a lower tip section of the forward swelling section 13 to extend forward. In predetermined positions of the front surface side and the back surface side of the lamp bracket 12, radiation fins 12a are integrally provided.

As shown in FIGS. 3 and 4 in detail, the first projection light source unit 10A has an optical axis La extending in the front-back direction, the shade 17 extends approximately horizontally and forward such that an extending tip section thereof is located in the vicinity of a rearward focal point F of the projection lens 19, the light-emitting elements 14a and 14b and the reflectors 16a and 16b are provided on the upper and lower sides on the rear side of the shade 17, a projection light source unit section 10A1 on the upper side is formed by the projection lens 19, the shade 17, the light-emitting element 14a on the upper side and the reflector 16a on the upper side, and a projection light source unit section 10A2 on the lower side is formed by the projection lens 19, the shade 17, the light-emitting element 14b on the lower side, and the reflector 16b on the lower side. That is, the upper and lower projection light source unit sections 10A1 and 10A2 are integrated to share the projection lens 19 and the shade 17.

The projection convex lens 19 arranged on the optical axis La projects an image on a focal plane including the rearward focal point F as an inverted image on a virtual vertical screen ahead of the headlamp.

The light-emitting element 14a is a white light-emitting diode having a square light-emitting chip in which the size is approximately 0.3 to 3 millimeters (mm) square, and the light-emitting chip is arranged to face upward in the vertical direction on the optical axis La.

A reflective surface 16a1 of the upper side reflector 16a is formed of an approximately ellipsoidal curved surface having a major axis identical to the optical axis La and with the center of light emission of the light-emitting element 14a as a first focal point. The reflective surface 16a1 is set to have a vertical sectional shape along the optical axis La in an ellipse shape with a point A, located slightly forward of the rearward focal point F of the lens, as a second focal point and is set to gradually increase in eccentricity from the vertical sectional plane to a horizontal sectional plane. Accordingly, the reflector 16a causes light from the light-emitting element 14a to converge in the point A in the vertical sectional plane (see reference numeral 17a of FIG. 3) and moves the convergence position considerably forward in the horizontal sectional plane.

On an upper side surface of the resin shade 17, an upward reflective surface 17a subjected to an aluminizing process is provided, and a front end edge of the upward reflective surface 17a is formed to extend along the focal plane including the rearward focal point F of the lens 19. Accordingly, as shown by reference numeral L17a1 in FIG. 3, a part of light reflected by the reflector 16a toward the point A is reflected upward by the upward reflective surface 17a to reach the projection lens 19, and is emitted from the projection lens 19 as downward light.

The shade 17 is provided with a downward reflective surface 17b which extends obliquely downward toward the rearward side from the front end edge of the upward reflective surface 17a. The light-emitting element 14b formed of the white light-emitting diode is arranged on a front-side inclined surface of the swelling section 13, which is continuous with a front-side inclined surface of the shade 17, such that the light-emitting chip thereof is provided rearward of and obliquely downward of the rearward focal point F so as to be directed obliquely downward, and the reflector 16b on the lower side, by which light from the light-emitting element 14b is reflected upward to approximately converge in a point B in the downward reflective surface 17b located slightly obliquely downward from the rearward focal point F, is also arranged.

A reflective surface 16b1 of the reflector 16b on the lower side is formed of an approximately ellipsoidal curved surface having a major axis on a line connecting the center of light emission of the light-emitting element 14b and the point B and with the center of light emission of the light-emitting element 14b as a first focal point. The reflective surface 16b1 is set to have a vertical sectional shape along the major axis in an ellipse shape with the point B as a second focal point, and is set to gradually increase in eccentricity from the vertical sectional plane to both right and left sides thereof. Accordingly, the reflector 16b causes light from the light-emitting element 14b to converge in the point B in the up-down direction and reduces the degree of convergence in the right-left direction.

The downward reflective surface 17b is formed of a flat surface tilted approximately 45° with respect to a horizontal surface including the optical axis La. Accordingly, as shown by reference numeral L17b in FIG. 4, a majority of reflected light from the reflector 16b is reflected forward by the downward reflective surface 17b to reach the projection lens 19. That is, the light from the light-emitting element 14b which is reflected by the reflector 16b is reflected forward by the downward reflective surface 17b in the vicinity of the point B to pass through a rearward focal plane of the projection lens 19 in the vicinity of the rearward focal point F.

When the projection light source unit 10A having the configuration described above is lighted, a low-beam distribution pattern Psa having a predetermined cut-off line CLsa which approximately coincides with a horizontal line H-H is formed on a virtual screen which is located 25 meters (m) forward by the light source unit section 10A1 on the upper side (by lighting the light-emitting element 14a on the upper side) to illuminate the vicinity of a center section of the screen as shown in FIG. 5(A), and an additional high-beam distribution pattern Pha having a lower end cut-off line CLha which approximately coincides with the predetermined cut-off line CLsa is formed by the light source unit section 10A2 on the lower side (by lighting the light-emitting element 14b on the lower side).

Although slightly differing in the shape of the shade 17 and the shapes of the reflective surfaces 16a1 and 16b1 of the reflectors 16a and 16b from the first projection light source unit 10A, the second and third projection light source units 10B and 10C have the same basic structure as the projection light source unit 10A (10A1 and 10A2) in that the upper and lower projection light source unit sections 10B1 and 10B2 (10C1 and 10C2) are integrated to share the projection convex lens 19 and the shade 17.

However, in this embodiment, optical axes La, Lb, and Lc of the projection light source units 10A, 10B, and 10C are not formed to be all parallel (formed such that cut-off lines CLa, CLb, and CLc of the high-beam distribution patterns of the respective light source units 10A, 10B, and 10C all coincide in the up-down direction). The optical axis Lb of the second projection light source unit 10B is tilted downward and forward by, for example, 0.2° with respect to the optical axis La of the first projection light source unit 10A as the reference which is set to be parallel to the optical axis of the headlamp, and the optical axis Lc of the third projection light source unit 10C is tilted downward and forward by, for example, 0.2° with respect to the optical axis Lb of the second projection light source unit 10B.

Therefore, in the second projection light source unit 10B, as shown in FIG. 5(B), a low-beam distribution pattern Psb having a predetermined cut-off line CLsb about 0.2° below the horizontal line H-H is formed by the light source unit section 10B1 on the upper side (by lighting the light-emitting element 14a on the upper side) to illuminate a region extended to some degree in the right-left direction from the vicinity of the center section of the screen, and an additional high-beam distribution pattern Phb having a lower end cut-off line CLhb which approximately coincides with the predetermined cut-off line CLsb is formed by the light source unit section 10B2 on the lower side (by lighting the light-emitting element 14b on the lower side).

In the same manner, in the third projection light source unit 10C, as shown in FIG. 5(C), a low-beam distribution pattern Psc having a predetermined cut-off line CLsc, for example, about 0.4° below the horizontal line H-H is formed by the light source unit section 10C1 on the upper side (by lighting the light-emitting element 14a on the upper side) to illuminate a region extended to a large degree in the right-left direction from the vicinity of the center section of the screen, and an additional high-beam distribution pattern Phc having a lower end cut-off line CLhc which approximately coincides with the predetermined cut-off line CLsc is formed by the light source unit section 10C2 on the lower side (by lighting the light-emitting element 14b on the lower side).

In this manner, the light source unit 10A is formed as a condenser projection light source unit which forms a small diffusion light distribution pattern shown in FIG. 5(A), the light source unit 10B is formed as a medium diffusion projection light source unit which forms a medium diffusion light distribution pattern shown in FIG. 5(B), and the light source unit 10C is formed as a large diffusion projection light source unit which forms a large diffusion light distribution pattern shown in FIG. 5(C).

With (the headlamp including) the light source unit assembly 10 in which the light source units 10A, 10B, and 10C are integrated, a low-beam distribution pattern PS (see FIG. 6) or a high-beam distribution pattern PH (see FIG. 7), in which the small, medium, and large diffusion light distribution patterns shown in FIGS. 5A to 5C are synthesized, is formed.

The high-beam distribution pattern formed by the light source unit 10A, i.e., the high-beam distribution pattern formed by the light source unit section 10A1 on the upper side and the light source unit section 10A2 on the lower side (by simultaneously lighting the light-emitting elements 14a and 14b on the upper and lower sides) has, as shown in FIG. 5(A), a shape in which the additional high-beam distribution pattern Pha having the lower end cut-off line CLha is placed above the low-beam distribution pattern Psa having the predetermined cut-off line CLsa such that the two cut-off lines CLsa and CLha become close to each other.

Due to the structure in which the light source unit sections 10A1 and 10A2 on the upper side and the lower side share the projection convex lens 19 and the cut-off line forming shade 17, a dark zone Dza is formed between the two cut-off lines CLsa and CLha.

In the same manner, as shown in FIGS. 5B and 5C, the high-beam distribution pattern formed by the light source unit 10B (10C) also has a shape in which the additional high-beam distribution pattern Phb (Phc) having the lower end cut-off line CLhb (CLhc) is placed above the low-beam distribution pattern Psb (Psc) having the predetermined cut-off line CLsb (CLsc) such that the two cut-off lines CLsb and CLhb (CLsc and CLhc) become close to each other, and dark zones Dzb and Dzc are formed between the two cut-off lines CLsb and CLhb (and CLsc and CLhc), respectively. In the same manner as in the case where the optical axes La, Lb, and Lc are all set to be parallel, it is confirmed that a width in the up-down direction of the dark zones Dza, Dzb, and Dzc is 0.2° at maximum in an angle corresponding to the displacement of the predetermined cut-off line of the low-beam distribution pattern and the lower end cut-off line of the additional high-beam distribution pattern.

In the case where the optical axes La, Lb, and Lc of the respective projection light source units 10A, 10B, and 10C are all set to be parallel, the dark zones Dza, Dzb, and Dzc at the same height on the screen overlap with each other in the high-beam distribution pattern of the headlamp (light distribution pattern in which the high-beam distribution patterns of the respective projection light source units 10A, 10B, and 10C are synthesized), whereby a dark zone Dz further stands out.

Thus, in this embodiment, the optical axis Lb of the second projection light source unit 10B is formed to tilt forward and downward by, for example, 0.2° with respect to the optical axis La of the first projection light source unit 10A which is set to be parallel to the optical axis of the headlamp, and the optical axis Lc of the third projection light source unit 10C is formed to tilt forward and downward by, for example, 0.2° with respect to the optical axis Lb of the second projection light source unit 10B. That is, the optical axis Lb of the second projection light source unit 10B is tilted forward and downward by, for example, 0.2° with respect to the optical axis La of the first projection light source unit 10A, and the optical axis Lc of the third projection light source unit 10C is tilted forward and downward by, for example, 0.4° with respect to the optical axis La of the first projection light source unit 10A.

Figure 8A:
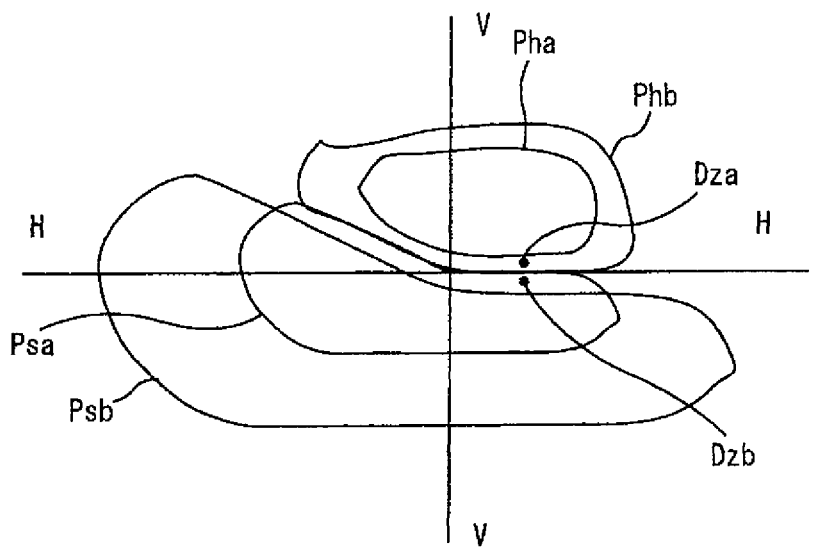
FIGS. 8A and 8B are illustrative views for illustrating a state in which a dark zone in the high-beam distribution pattern is diluted.
Figure 8B:
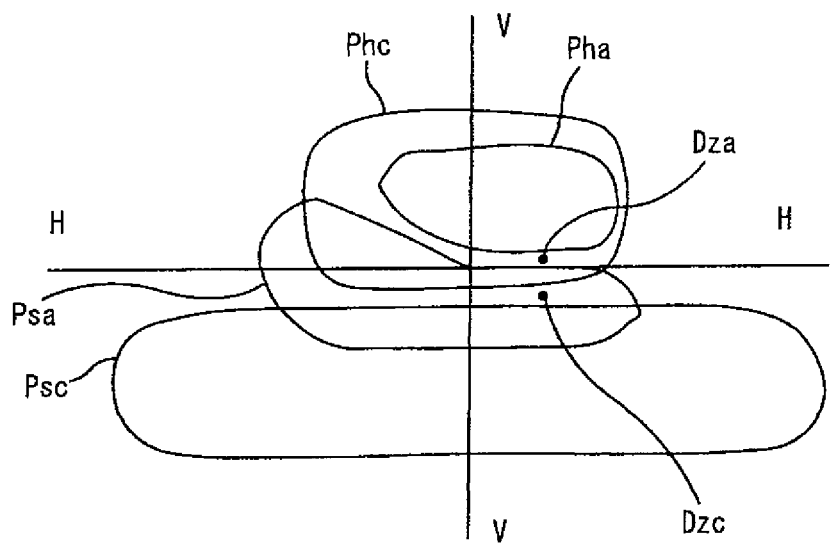

Therefore, for example, as shown in FIG. 8(A), the dark zone Dzb in the high-beam distribution pattern of the projection light source unit 10B is displaced downward by, for example, 0.2° with respect to the dark zone Dza in the high-beam distribution pattern of the projection light source unit 10A, whereby the dark zone Dza overlaps with the additional high-beam distribution pattern Phb of the projection light source unit 10B and the dark zone Dzb overlaps with the low-beam distribution pattern Psa of the projection light source unit 10A. Further, as shown in FIG. 8(B), the dark zone Dzc in the high-beam distribution pattern of the projection light source unit 10C is displaced downward by, for example, 0.4° with respect to the dark zone Dza in the high-beam distribution pattern of the projection light source unit 10A, whereby the dark zone Dza overlaps with the additional high-beam distribution pattern Phc of the projection light source unit 10C and the dark zone Dzc overlaps with the low-beam distribution pattern Psa of the projection light source unit 10A.

In this manner, each of the dark zones Dza, Dzb, and Dzc in the high-beam distribution patterns of the projection light source units 10A, 10B, and 10C overlaps with the high-beam distribution pattern region (illuminated region) of another projection light source unit such that the dark zones Dza, Dzb, and Dzc move within the light distribution pattern (illuminated region) to be diluted, whereby the dark zones Dza, Dzb, and Dzc do not stand out at all in the high-beam distribution pattern PH (i.e., light distribution pattern in which the high-beam distribution patterns of the respective projection light source units are synthesized). Thus, high-beam distribution pattern PH of the headlamp shown in FIG. 7 and the forward visibility of a high beam is improved.

In the low-beam distribution pattern PS of the headlamp shown in FIG. 6, (the cut-off lines CLsb and CLsc of) the low-beam distribution patterns Psb and Psc of the second and third projection light source units 10B and 10C are sequentially displaced downward by 0.2° with respect to (the cut-off line CLsa of) the low-beam distribution pattern Psa of the first projection light source unit 10A which is set to be parallel to the optical axis of the headlamp, whereby there are differences of 8.7 cm among the cut-off lines CLsa, CLsb, and CLsc on the screen which is located 25 m forward. However, because the cut-off line CLsa of the small diffusion light distribution pattern Psa having the highest luminous flux density effectively functions in the vicinity of the center in the right-left direction ahead of the vehicle, a clear cut-off line can be obtained approximately in the same manner as in the case where the cut-off lines CLsa, CLsb, and CLsc coincide.

Rather, the cut-off lines CLsa, CLsb, and CLsc being displaced respectively by 0.2° has an effect of reducing an excessive contrast difference above and below the cut-off line of the low-beam distribution pattern of the headlamp and enlarging the illuminated region of a low beam on the near side ahead of the vehicle, whereby the forward visibility of the low beam is improved.

Figure 9:
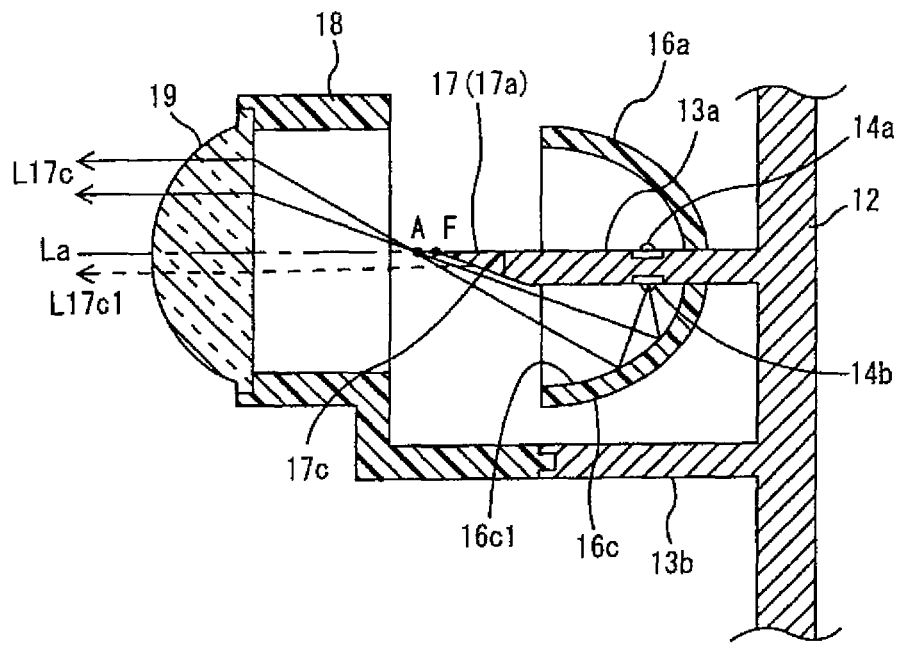
FIG. 9 is a vertical sectional view of a projection light source unit forming a projection light source unit assembly as a main section of an automobile headlamp of a second embodiment of the present invention.

FIG. 9 is a vertical sectional view of a projection light source unit forming a projection light source unit assembly as a main section of an automobile headlamp of a second embodiment of the present invention.

In the first embodiment described above, the light-emitting element 14b on the lower side and the reflector 16b on the lower side forming the respective projection light source units 10A, 10B, and 10C are provided to the front-side inclined surface of the swelling section 13, which is steeper than the downward reflective surface 17b, whereby reflected light from the reflector 16b converges in the point B. However, in this embodiment, reflected light from a reflector 16c converges in the point A.

That is, on the front surface side of the bracket 12, a pair of upper and lower flat plate-shaped protrusion sections 13a and 13b are provided instead of the forward swelling section 13 in the first embodiment described above, the lens holder 18 is attached to a front end section of the lower flat plate-shaped protrusion section 13b, and the shade 17 is attached to a front end section of the upper flat plate-shaped protrusion section 13a.

The front end side of the upper flat plate-shaped protrusion section 13a and the shade 17 are formed to be thin so as not to block light which is from the light-emitting element 14b, reflected by the reflector 16c on the lower side, and directed toward the point A.

The light from the light-emitting element 14b is reflected by the reflector 16c to mainly converge in the point A as shown by reference numeral L17c. However, a part of the light directed toward the point A is reflected by a downward reflective surface 17c as shown by reference numeral L17c1 to be directed toward the projection convex lens 19.

Other configurations are the same as those of the first embodiment, and the same reference numerals are assigned to omit redundant descriptions.

Figure 10:
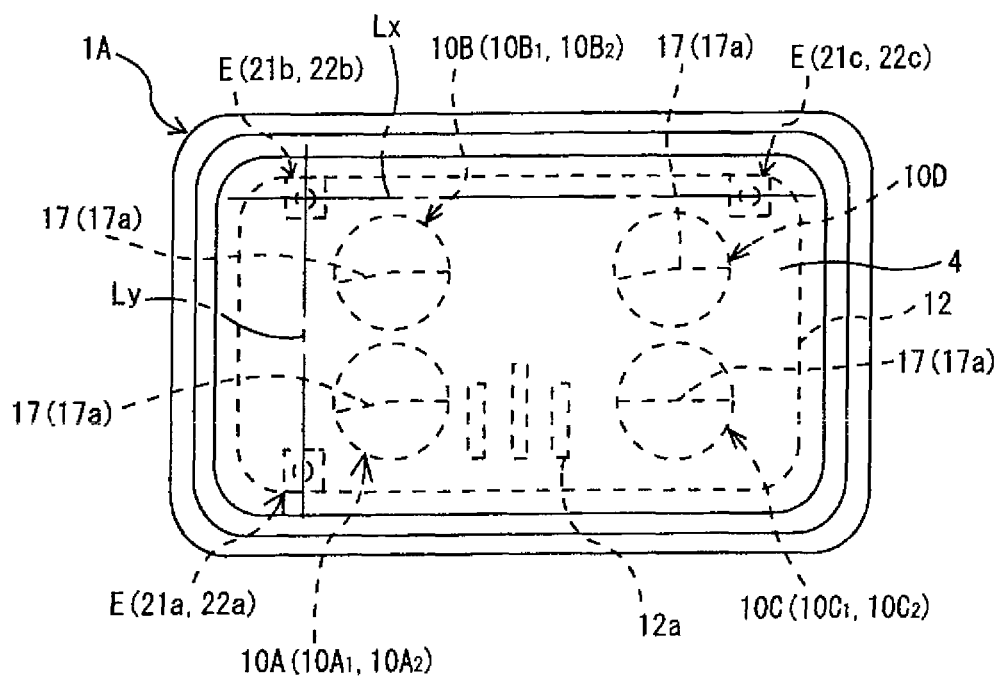
FIG. 10 is a front view of an automobile headlamp of a third embodiment of the present invention.
Figure 11:
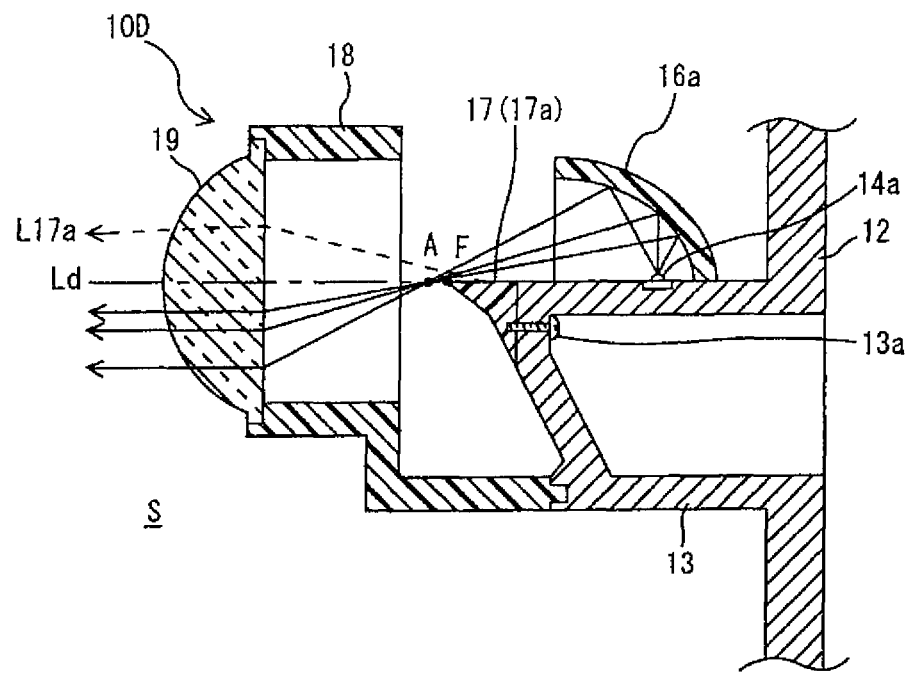
FIG. 11 is a vertical sectional view of a fourth projection light source unit forming a projection light source unit assembly as a main section of the headlamp.
Figure 12:
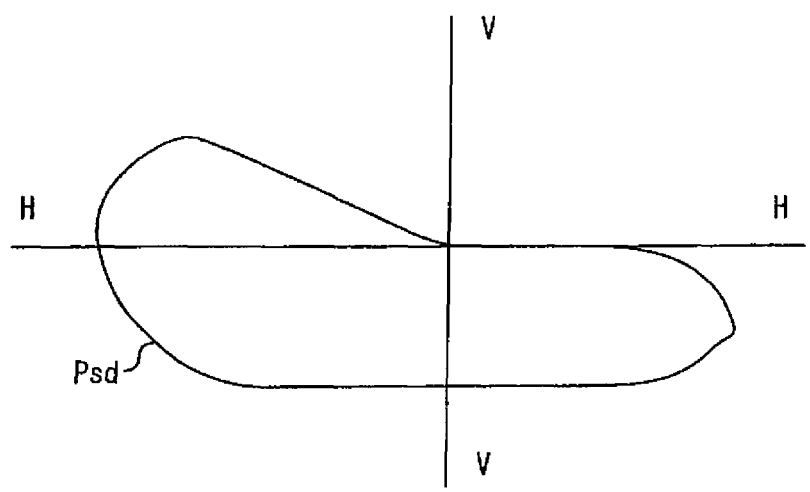
FIG. 12 is a front view of a light distribution pattern of the projection light source unit shown in FIG. 11.
Figure 13:
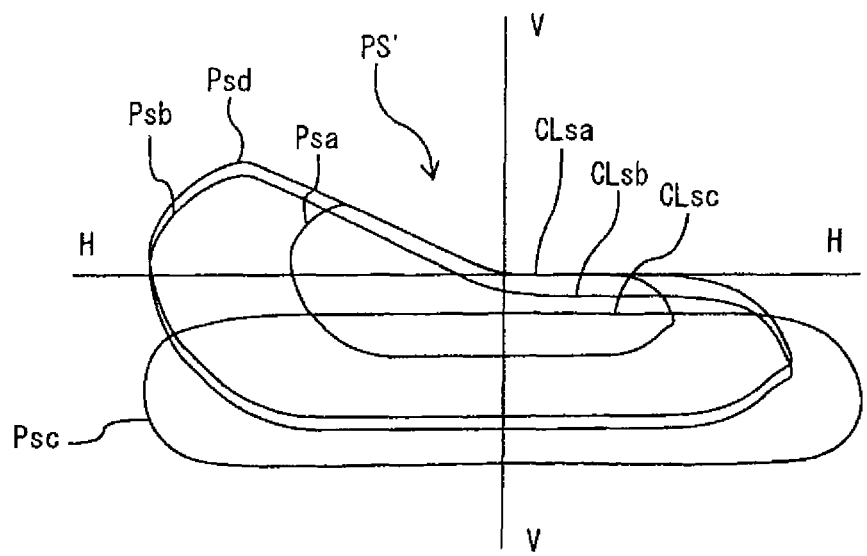
FIG. 13 is a front view showing a low-beam distribution pattern of the headlamp (projection light source unit assembly).
Figure 14:
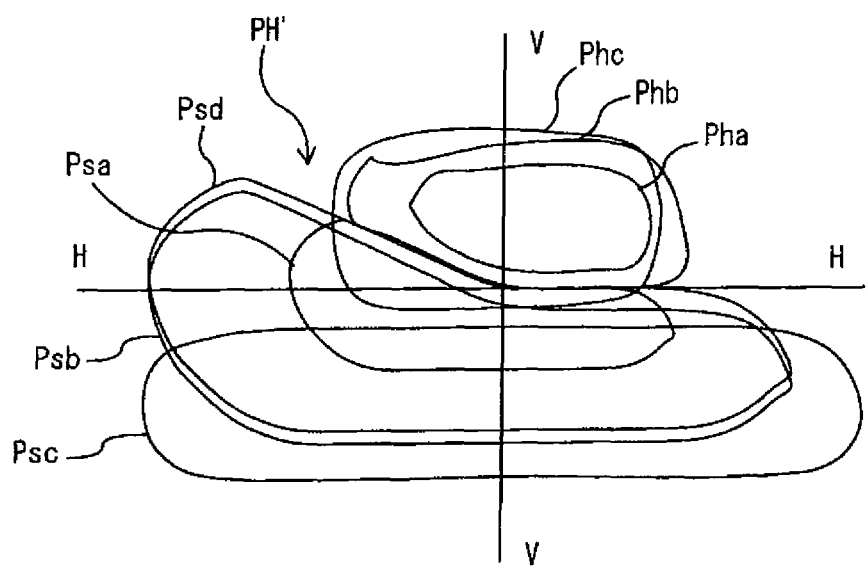
FIG. 14 is a front view showing a high-beam distribution pattern of the headlamp (projection light source unit assembly).
Figure 15:
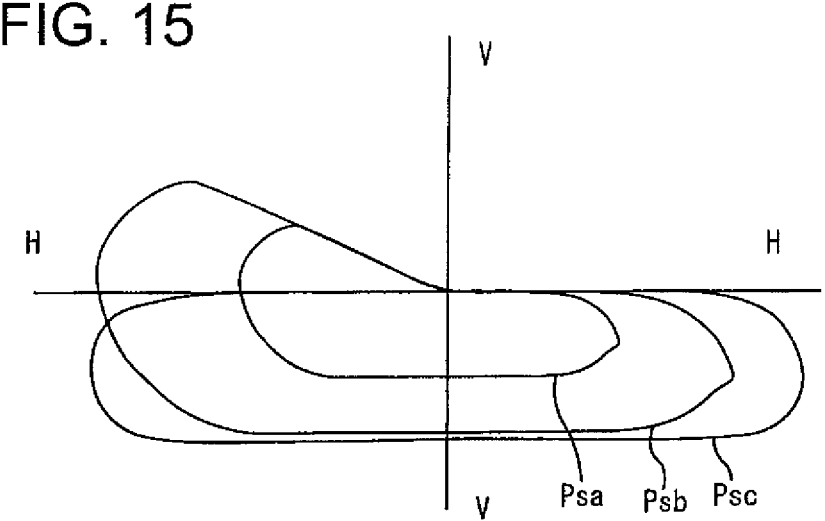
FIG. 15 is a front view showing a low-beam distribution pattern of a headlamp (projection light source unit assembly) employing the configuration of Patent Document 2.
Figure 16:
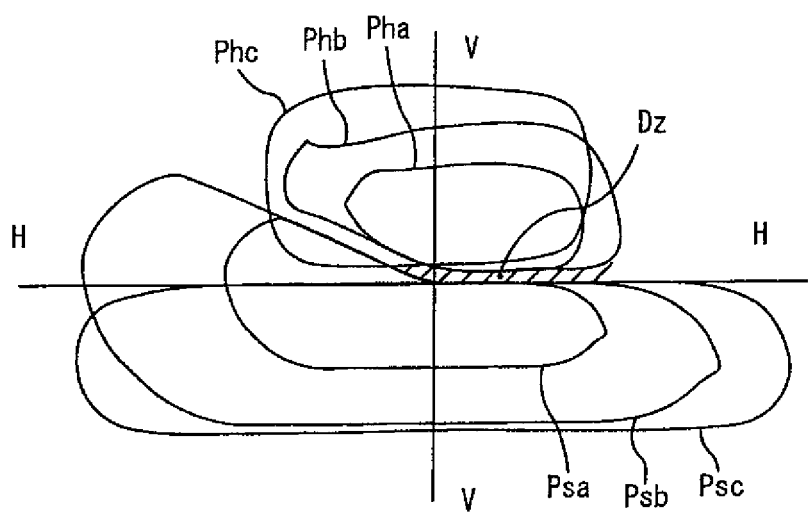
FIG. 16 is a front view showing a high-beam distribution pattern of a headlamp (projection light source unit assembly) employing the configuration of Patent Document 2.
Figure 17A:
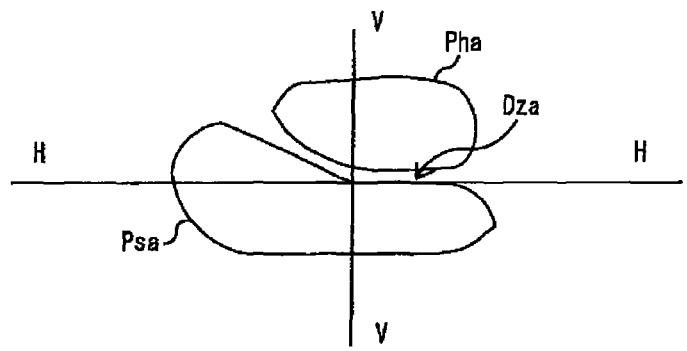
FIGS. 17A to 17C are front views showing light distribution patterns of respective projection light source units forming the projection light source unit assembly employing the configuration of Patent Document 2.
Figure 17B:
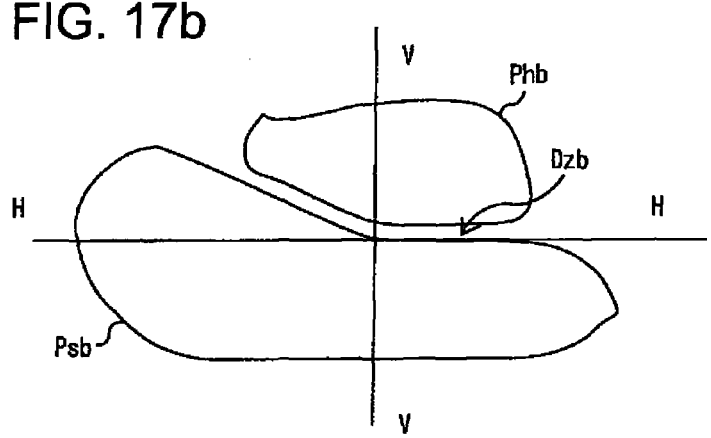
Figure 17C:
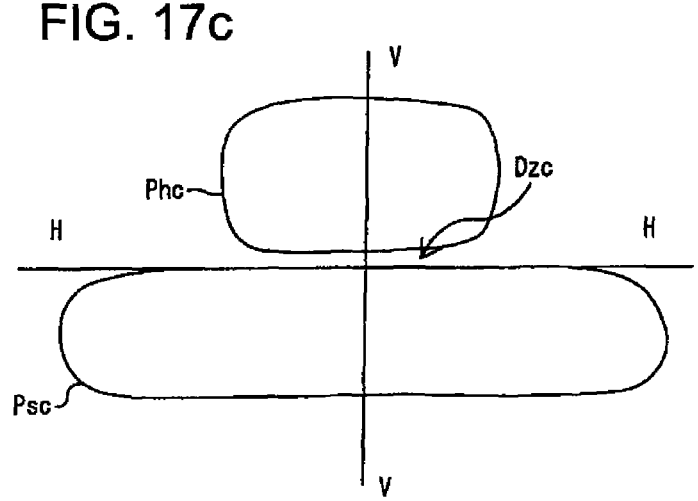

FIGS. 10 to 14 show an automobile headlamp of a third embodiment of the present invention. FIG. 10 is a front view of the automobile headlamp, FIG. 11 is a vertical sectional view of a fourth projection light source unit forming a projection light source unit assembly as a main section of the headlamp, FIG. 12 is a front view of a light distribution pattern of the projection light source unit shown in FIG. 11, FIG. 13 is a front view showing a low-beam distribution pattern of the headlamp (projection light source unit assembly), and FIG. 14 is a front view showing a high-beam distribution pattern of the headlamp projection light source unit assembly).

In the headlamp 1 of the first embodiment described above, the light source unit assembly 10, in which the three projection light source units 10A, 10B, and 10C are integrated with the lamp bracket 12, is stored in the lamp chamber S. However, in a headlamp 1A of the third embodiment, a light source unit assembly 10', in which four projection light source units 10A, 10B, 10C, and 10D are integrated with the lamp bracket 12, is disposed in the lamp chamber S.

That is, other than the projection light source units 10A, 10B, and 10C forming the light source unit assembly 10 of the first embodiment described above, the projection light source unit 10D which forms a low-beam distribution pattern is added.

The projection light source unit 10D has a structure in which the light-emitting element 14b on the lower side and the reflector 16b on the lower side are omitted from the projection light source unit 10B and in which an optical axis Ld thereof is set to be parallel to the optical axis La of the projection light source unit 10A, thereby forming a medium diffusion light distribution pattern Psd for a low beam such as that shown in FIG. 12.

Other configurations are the same as those of the first embodiment, and the same reference numerals are assigned to omit redundant descriptions.

With (the headlamp 1A including) the projection light source unit assembly in which the light source units 10A, 10B, 10C, and 10D are integrated, a low-beam distribution pattern PS' and a high-beam distribution pattern PH' shown in FIGS. 13 and 14, in which the low-beam distribution pattern PS and the high-beam distribution pattern PH shown in FIGS. 6 and 7 are synthesized with the medium diffusion light distribution pattern Psd shown in FIG. 12, are formed.

In the low-beam distribution pattern PS' of FIG. 13, the light distribution pattern Psd having the same shape as the medium diffusion pattern Psb is synthesized (added) such that a cut-off line CLsd thereof coincides with the cut-off line CLsa of the small diffusion light distribution pattern Psa, whereby the difference between the cut-off lines CLsa and CLsb is eliminated to correspondingly improve the visibility ahead of the vehicle with a low beam compared with the first embodiment.

In the high-beam distribution pattern PH' of FIG. 14, the light distribution pattern Psd having the same shape as the medium diffusion pattern Psb is synthesized (added) such that the cut-off line CLsd thereof coincides with the cut-off line CLsa of the small diffusion light distribution pattern Psa, whereby the dark zone is further diluted by the added light distribution pattern Psd to correspondingly improve the visibility ahead of the vehicle with a high beam compared with the first embodiment.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS

S LAMP CHAMBER
10 PROJECTION LIGHT SOURCE UNIT ASSEMBLY
10A CONDENSOR PROJECTION LIGHT SOURCE UNIT AS FIRST PROJECTION LIGHT SOURCE UNIT AS REFERENCE
10A1 PROJECTION LIGHT SOURCE UNIT SECTION ON UPPER SIDE
10A2 PROJECTION LIGHT SOURCE UNIT SECTION ON LOWER SIDE
10B MEDIUM DIFFUSION PROJECTION LIGHT SOURCE UNIT AS SECOND PROJECTION LIGHT SOURCE UNIT
10B1 PROJECTION LIGHT SOURCE UNIT SECTION ON UPPER SIDE

10B2 PROJECTION LIGHT SOURCE UNIT SECTION ON LOWER SIDE
10C LARGE DIFFUSION PROJECTION LIGHT SOURCE UNIT AS THIRD PROJECTION LIGHT SOURCE UNIT
10C1 PROJECTION LIGHT SOURCE UNIT SECTION ON UPPER SIDE
10C2 PROJECTION LIGHT SOURCE UNIT SECTION ON LOWER SIDE
PS LOW-BEAM DISTRIBUTION PATTERN OF PROJECTION LIGHT SOURCE UNIT ASSEMBLY
Psa LOW-BEAM SMALL DIFFUSION LIGHT DISTRIBUTION PATTERN
Psb LOW-BEAM MEDIUM DIFFUSION LIGHT DISTRIBUTION PATTERN
Psc LOW-BEAM LARGE DIFFUSION LIGHT DISTRIBUTION PATTERN
CLsa, CLsb, and CLsc UPPER END CUT-OFF LINE
PH HIGH-BEAM DISTRIBUTION PATTERN OF PROJECTION LIGHT SOURCE UNIT ASSEMBLY
Pha ADDITIONAL HIGH-BEAM DISTRIBUTION PATTERN (SMALL DIFFUSION LIGHT DISTRIBUTION PATTERN)
Phb ADDITIONAL HIGH-BEAM DISTRIBUTION PATTERN (MEDIUM DIFFUSION LIGHT DISTRIBUTION PATTERN)
Phc ADDITIONAL HIGH-BEAM DISTRIBUTION PATTERN (LARGE DIFFUSION LIGHT DISTRIBUTION PATTERN)
CLha, CLhb, and CLhc LOWER END CUT-OFF LINE
12 LAMP BRACKET
14a LIGHT-EMITTING ELEMENT AS LIGHT SOURCE (LIGHT-EMITTING ELEMENT ON UPPER SIDE)
14b LIGHT-EMITTING ELEMENT AS LIGHT SOURCE (LIGHT-EMITTING ELEMENT ON LOWER SIDE)
16a UPPER SIDE REFLECTOR
16b LOWER SIDE REFLECTOR
17 CUT-OFF LINE FORMING SHADE
17a UPWARD REFLECTIVE SURFACE
17b DOWNWARD REFLECTIVE SURFACE
18 LENS HOLDER
19 PROJECTION CONVEX LENS
La OPTICAL AXIS OF FIRST PROJECTION LIGHT SOURCE UNIT
Lb OPTICAL AXIS OF SECOND PROJECTION LIGHT SOURCE UNIT
Lc OPTICAL AXIS OF THIRD PROJECTION LIGHT SOURCE UNIT
E AIMING MECHANISM
Lx HORIZONTAL TILT AXIS
Ly VERTICAL TILT AXIS
21a, 21b, and 21c AIMING SCREW
A and B CONVERGENCE POINT
F REARWARD FOCAL POINT OF PROJECTION CONVEX LENS

What is claimed is:

1. An automobile headlamp comprising:
a plurality of projection light source units disposed on a single bracket in a lamp chamber,
wherein the plurality of projection light source units comprises a first projection light source unit and a second projection light source unit,
wherein each of the plurality of projection light source units comprises:
   a projection lens,
   a cut-off line forming shade,
   a first light-emitting element disposed above the shade and a second light-emitting element disposed below the shade as a light source, and
   a first reflector disposed above the shade which reflects light emitted from the first light-emitting element to be guided to the projection lens, and a second reflector disposed below the shade which reflects light emitted from the second light-emitting element to be guided to the projection lens,
wherein light distribution patterns formed by the plurality of projection light source units respectively are synthesized to form a light distribution pattern of the headlamp,
wherein, in each of the projection light source units, the shade extends approximately horizontally and forward such that an extending tip section thereof is located in a vicinity of a rearward focal point of the projection lens,
wherein a low-beam distribution pattern having a predetermined cut-off line is formed by a light source unit section on an upper side comprising the projection lens, the shade, the first light-emitting element, and the first reflector,
wherein an additional high-beam distribution pattern having a lower end cut-off line which approximately coincides with the predetermined cut-off line is formed by a light source unit section on a lower side comprising the projection lens, the shade, the second light-emitting element, and the second reflector,
wherein each of the first projection light source unit and the second projection light source unit forms a dark zone between the predetermined cut-off line and the lower end cut-off line, and
wherein an optical axis of the first projection light source unit is set to be parallel to an optical axis of the headlamp, and an optical axis of the second projection light source unit is slightly tilted forward and downward with respect to the optical axis of the headlamp, such that the low-beam distribution pattern of the first projection light source unit illuminates the dark zone formed by the second projection light source unit, and the additional high-beam distribution pattern of the second projection light source unit illuminates the dark zone formed by the first projection light source unit.

2. The automobile headlamp according to claim 1, wherein the optical axis of the second projection light source unit is tilted forward and downward with respect to the optical axis of the one projection light source unit at least by a degree corresponding to a width in an up-down direction (displacement between the predetermined cut-off line of the low-beam distribution pattern and the lower end cut-off line of the additional high-beam distribution pattern) of a dark zone in the high-beam distribution pattern of the first projection light source unit.

3. The automobile headlamp according to claim 1,
wherein the first projection light source unit is formed as a first projection light source unit which forms a small diffusion light distribution pattern illuminating mainly a region in a vicinity of the optical axis of the headlamp,
wherein the second projection light source unit is formed as a second projection light source unit which has an optical axis slightly tilted forward and downward with respect to an optical axis of the first projection light source unit and which forms a medium diffusion light distribution pattern larger than the small diffusion light distribution pattern, and wherein the plurality of projection light source units further comprises a third projection light source unit which has an optical axis slightly tilted forward and downward with respect to the optical axis of the second projection light source unit and which forms a large diffusion light distribution pattern larger than the medium diffusion light distribution pattern.

4. The automobile headlamp according to claim 1, wherein the bracket is a metal bracket, the plurality of projection light source units are integrated with the metal bracket as a light source unit assembly, and an aiming mechanism mounted between a lamp body that segments the lamp chamber and the metal bracket allows an aiming adjustment of the light source unit assembly.

5. An automobile headlamp comprising:

a plurality of projection light source units disposed on a single bracket in a lamp chamber, wherein the plurality of projection light source units comprises a first projection light source unit and a second projection light source unit, wherein each of the plurality of projection light source units comprises:

a projection lens;

a cut-off line forming shade extending approximately horizontally and forward such that an extending tip section thereof is located in a vicinity of a rearward focal point of the projection lens;

a first light-emitting element disposed above the shade and a second light-emitting element disposed below the shade as a light source; and a first reflector disposed above the shade which reflects light emitted from the first light-emitting element to be guided to the projection lens, and a second reflector disposed below the shade which reflects light emitted from the second light-emitting element to be guided to the projection lens, wherein a low-beam distribution pattern having a predetermined cut-off line is formed by a light source unit section on an upper side comprising the projection lens, the shade, the first light-emitting element, and the first reflector, wherein an additional high-beam distribution pattern having a lower end cut-off line which approximately coincides with the predetermined cut-off line is formed by the light source unit section on a lower side comprising the projection lens, the shade, the second light-emitting element, and the second reflector, wherein each of the first projection light source unit and the second projection light source unit forms a dark zone between the predetermined cut-off line and the lower end cut-off line, wherein first projection light source unit has an optical axis set to be parallel to an optical axis of the headlamp, and wherein the second projection light source unit has an optical axis set to be slightly tilted forward and downward with respect to the optical axis of the headlamp, such that the low-beam distribution pattern of the first projection light source unit illuminates the dark zone formed by the second projection light source unit, and the additional high-beam distribution pattern of the second projection light source unit illuminates the dark zone formed by the first projection light source unit.

6. The automobile headlamp according to claim 5, wherein the optical axis of the second projection light source unit is set to be tilted forward and downward at least by a degree corresponding to a width in an up-down direction (displacement between the predetermined cut-off line of the low-beam distribution pattern and the lower end cut-off line of the additional high-beam distribution pattern) of a dark zone in the high-beam distribution pattern of the first projection light source unit.

7. The automobile headlamp according to claim 5, wherein the first projection light source unit forms a small diffusion light distribution pattern illuminating mainly a region in a vicinity of the optical axis of the headlamp, the second projection light source unit forms a medium diffusion light distribution pattern larger than the small diffusion light distribution pattern, and wherein the plurality of projection light source units further comprises a third projection light source unit having an optical axis slightly tilted forward and downward with respect to the optical axis of the second projection light source unit and which forms a large diffusion light distribution pattern larger than the medium diffusion light distribution pattern.

8. The automobile headlamp according to claim 5, wherein the bracket is a metal bracket that integrates the plurality of projection light source units as a light source assembly, and further comprises an aiming mechanism mounted between a lamp body that segments the lamp chamber and the metal bracket capable of adjusting aiming of the light source assembly.

9. A method of manufacturing an automobile headlamp comprising:

disposing a plurality of projection light source units on a single bracket in a lamp chamber, wherein the plurality of projection light source units comprises a first projection light source unit and a second projection light source unit, wherein each of the plurality of projection light source units comprises:

a projection lens;

a cut-off line forming shade extending approximately horizontally and forward such that an extending tip section thereof is located in a vicinity of a rearward focal point of the projection lens;

a first light-emitting element disposed above the shade and a second light-emitting element disposed below the shade as a light source; and a first reflector disposed above the shade which reflects light emitted from the first light-emitting element to be guided to the projection lens, and a second reflector disposed below the shade which reflects light emitted from the second light-emitting element to be guided to the projection lens, wherein a low-beam distribution pattern having a predetermined cut-off line is formed by a light source unit section on an upper side comprising the projection lens, the shade, the first light-emitting element, and the first reflector, and wherein an additional high-beam distribution pattern having a lower end cut-off line which approximately coincides with the predetermined cut-off line is formed by the light source unit section on a lower side comprising the projection lens, the shade, the second light-emitting element, and the second reflector, wherein each of the first projection light source unit and the second projection light source unit forms a dark zone between the predetermined cut-off line and the lower end cut-off line, and wherein the method further comprises:
arranging the first projection light source unit to have an optical axis set to be parallel to an optical axis of the headlamp, and arranging the second projection light source unit to have an optical axis set to be slightly tilted forward and downward with respect to the optical axis of the headlamp, such that the low-beam distribution pattern of the first projection light source unit illuminates the dark zone formed by the second projection light source unit, and the additional high-beam distribution pattern of the second projection light source unit illuminates the dark zone formed by the first projection light source unit.

10. The method of manufacturing an automobile headlamp according to claim 9, wherein the optical axis of the second projection light source unit is set to be tilted forward and downward at least by a degree corresponding to a width in an up-down direction (displacement between the predetermined cut-off line of the low-beam distribution pattern and the lower end cut-off line of the additional high-beam distribution pattern) of a dark zone in the high-beam distribution pattern of the first projection light source unit.

11. The method of manufacturing an automobile headlamp according to claim 9, wherein
the arranging of the first projection light source unit to have the optical axis set to be parallel to the optical axis of the headlamp comprises:
arranging a first projection light source unit to form a small diffusion light distribution pattern illuminating mainly a region in a vicinity of the optical axis of the headlamp; and the arranging of the second projection light source unit to have the optical axis set to be slightly tilted forward and downward comprises:
arranging a second projection light source unit to have an optical axis slightly tilted forward and downward with respect to an optical axis of the first projection light source unit and to form a medium diffusion light distribution pattern larger than the small diffusion light distribution pattern, and the method further comprising arranging a third projection light source unit to have an optical axis slightly tilted forward and downward with respect to the optical axis of the second projection light source unit and to form a large diffusion light distribution pattern larger than the medium diffusion light distribution pattern.

12. The method of manufacturing an automobile headlamp according to claim 9,
wherein the bracket is a metal bracket, and
wherein the method further comprises:
integrating the plurality of projection light source units as a light source assembly with the metal bracket; and mounting an aiming mechanism between a lamp body that segments the lamp chamber and the metal bracket so as to allow aiming adjustment of the light source assembly.

* * * * *